United States Patent
Kwasnick et al.

(10) Patent No.: US 12,007,863 B2
(45) Date of Patent: Jun. 11, 2024

(54) OUT-OF-SPECIFICATION DETECTION

(71) Applicant: Intel Corporation, Santa Clara, CA (US)

(72) Inventors: Robert Forrest Kwasnick, Palo Alto, CA (US); Daniel J. Ragland, Sherwood, OR (US)

(73) Assignee: Intel Corporation, Santa Clara, CA (US)

( * ) Notice: Subject to any disclaimer, the term of this patent is extended or adjusted under 35 U.S.C. 154(b) by 15 days.

(21) Appl. No.: 16/728,703

(22) Filed: Dec. 27, 2019

(65) Prior Publication Data
US 2020/0133813 A1  Apr. 30, 2020

(51) Int. Cl.
*G06F 11/30* (2006.01)

(52) U.S. Cl.
CPC ........ *G06F 11/3058* (2013.01); *G06F 11/301* (2013.01)

(58) Field of Classification Search
CPC ............................ G06F 11/3058; G06F 11/301
See application file for complete search history.

(56) References Cited

U.S. PATENT DOCUMENTS

| | | | | |
|---|---|---|---|---|
| 8,305,737 | B2* | 11/2012 | Ewing | G05F 3/00 361/622 |
| 10,310,548 | B2* | 6/2019 | Park | G06F 1/08 |
| 2014/0101368 | A1* | 4/2014 | Rose | G06F 21/73 711/E12.008 |
| 2018/0308527 | A1* | 10/2018 | Narayanan | G06F 1/30 |
| 2020/0126748 | A1* | 4/2020 | Lee | H02H 1/0061 |
| 2020/0387422 | A1* | 12/2020 | Bell | G06F 3/0614 |
| 2021/0182141 | A1* | 6/2021 | Balb | G11C 29/1201 |

FOREIGN PATENT DOCUMENTS

DE  102020130969 A1  7/2021

* cited by examiner

*Primary Examiner* — Elias Desta
(74) *Attorney, Agent, or Firm* — Patent Capital Group

(57) ABSTRACT

Particular embodiments described herein provide for an electronic device that can be configured to include a system condition engine and non-volatile memory. The system condition engine is configured to monitor a condition associated with an electronic device and non-volatile memory. The non-volatile memory can store a predetermined specification range or a specification threshold for the condition and when the condition is outside of the predetermined specification range or exceeds the specification threshold, the system condition engine can record that the condition was outside of the predetermined specification range or exceeded the specification threshold in the non-volatile memory. In an example, the non-volatile memory may be a fuse, especially a field programmable fuse.

20 Claims, 7 Drawing Sheets

OUT-OF-SPECIFICATION DETECTION

TECHNICAL FIELD

This disclosure relates in general to the field of computing, and more particularly, to out-of-specification detection.

BACKGROUND

End users have more electronic device choices than ever before. A number of prominent technological trends are currently afoot and some of the technological trends can place increasing performance demands on the system. One way to deal with the increasing performance demands is to overclock processors and/or operate outside of specification ranges. However, a processor that has been overclocked is more likely to fail than one that has not been overclocked. In addition, using devices outside of specifications (e.g., temperature, impact force, relative humidity, altitude, etc.) can negatively affect a system.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

The FIGURES of the drawings are not necessarily drawn to scale, as their dimensions can be varied considerably without departing from the scope of the present disclosure.

DETAILED DESCRIPTION

Example Embodiments

The following detailed description sets forth examples of apparatuses, methods, and systems relating to enabling out-of-specification detection. Features such as structure(s), function(s), and/or characteristic(s), for example, are described with reference to one embodiment as a matter of convenience; various embodiments may be implemented with any suitable one or more of the described features.

In the following description, various aspects of the illustrative implementations will be described using terms commonly employed by those skilled in the art to convey the substance of their work to others skilled in the art. However, it will be apparent to those skilled in the art that the embodiments disclosed herein may be practiced with only some of the described aspects. For purposes of explanation, specific numbers, materials, and configurations are set forth in order to provide a thorough understanding of the illustrative implementations. However, it will be apparent to one skilled in the art that the embodiments disclosed herein may be practiced without the specific details. In other instances, well-known features are omitted or simplified in order not to obscure the illustrative implementations.

In the following detailed description, reference is made to the accompanying drawings that form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the following detailed description is not to be taken in a limiting sense. For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C). Reference to "one embodiment" or "an embodiment" in the present disclosure means that a particular feature, structure, or characteristic described in connection with the embodiment is included in at least one embodiment. The appearances of the phrase "in one embodiment" or "in an embodiment" are not necessarily all referring to the same embodiment. The appearances of the phrase "for example," "in an example," or "in some examples" are not necessarily all referring to the same example.

Figure 1A:
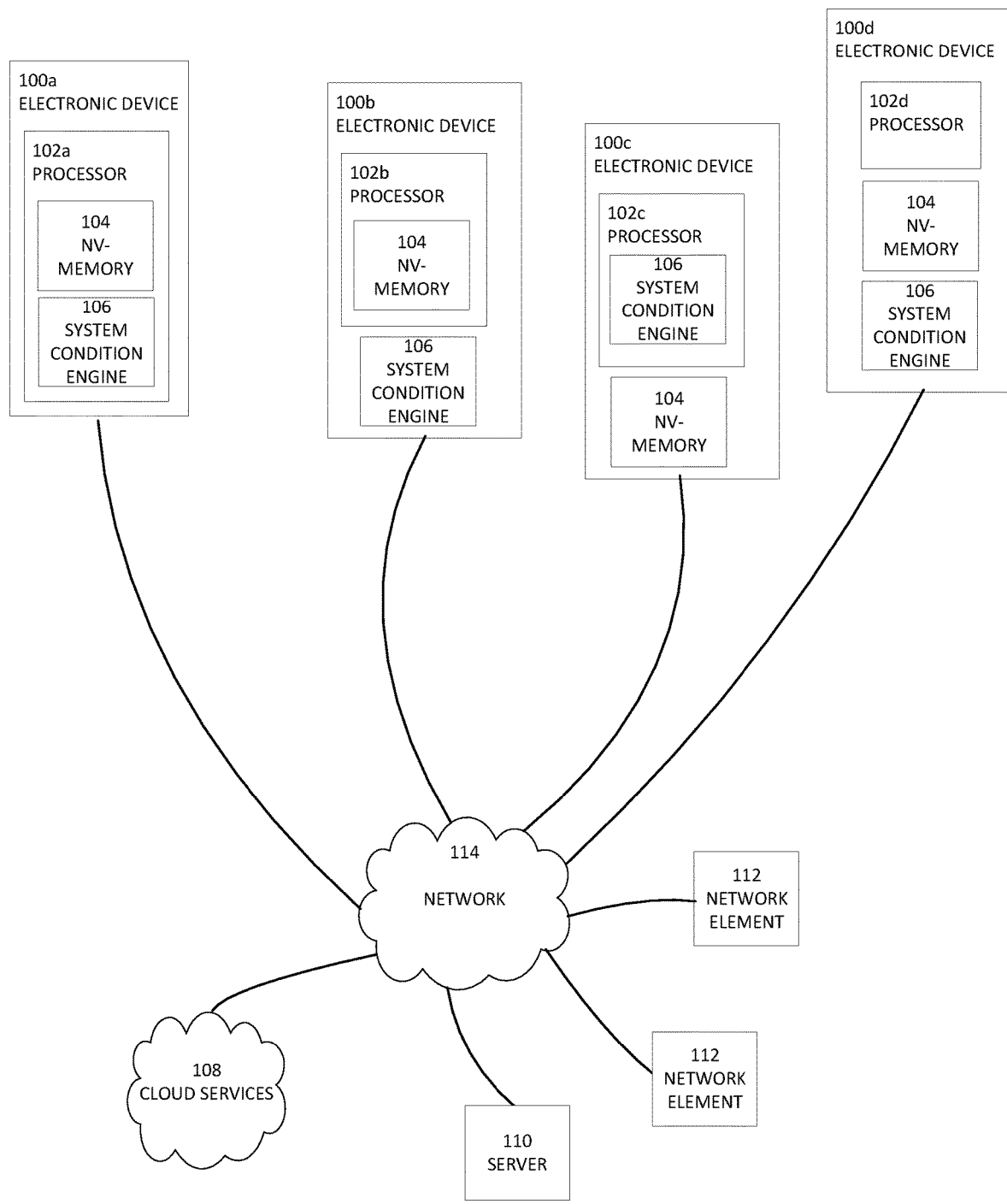
FIG. 1A is a simplified block diagram of electronic devices to enable out-of-specification detection, in accordance with an embodiment of the present disclosure.

FIG. 1A is a simplified block diagram of electronic devices configured with out-of-specification detection, in accordance with an embodiment of the present disclosure. In an example, an electronic device 100a can include a processor 102a. Processor 102a can include non-volatile memory 104 and a system condition engine 106. An electronic device 100b can include a processor 102b and system condition engine 106. Processor 102b can include non-volatile memory 104. An electronic device 100c can include a processor 102c and non-volatile memory 104. Processor 102c can include system condition engine 106. An electronic device 100d can include a processor 102d, non-volatile memory 104, and system condition engine 106. Each of electronic devices 100a-100d may be in communication with cloud services 108, server 110, and/or one or more network elements 112 using network 114. In some examples, one or more of electronic devices 100a-100d may be a standalone device and not connected to network 114 or another device.

System condition engine 106 can be configured to monitor one or more conditions associated with an electronic device. For example, system condition engine 106 in electronic device 100a can be configured to monitor when a processor is overclocked or operating at a frequency above a frequency specified for that processor, a temperature condition, a pressure condition, an impact force condition, a relative humidity condition, an altitude condition, or some other condition associated with electronic device 100a. Non-volatile memory 104 can store a predetermined range or a threshold for each of the one or more conditions associated with the electronic device being monitored by system condition engine 106. For example, non-volatile memory 104 can store a predetermined specification range or a specification threshold that indicates when a processor is overclocked, a predetermined specification range or a specification threshold for a temperature condition, pressure condition, impact force condition, relative humidity condition, or altitude condition that may negatively affect electronic device 100a, or some other condition may negatively affect electronic device 100a. When one of the one or more conditions associated with an electronic device is outside of a predetermined range or exceeds a threshold, system condition engine 106 can record that the condition was outside of the predetermined range or exceeded the threshold. For example, when one of the one or more monitored conditions associated with electronic device 100a is outside of a predetermined range or exceeds a threshold, system condition engine 106 can record that the condition was outside of the predetermined range or exceeded the threshold in non-volatile memory 104.

Figure 1B:
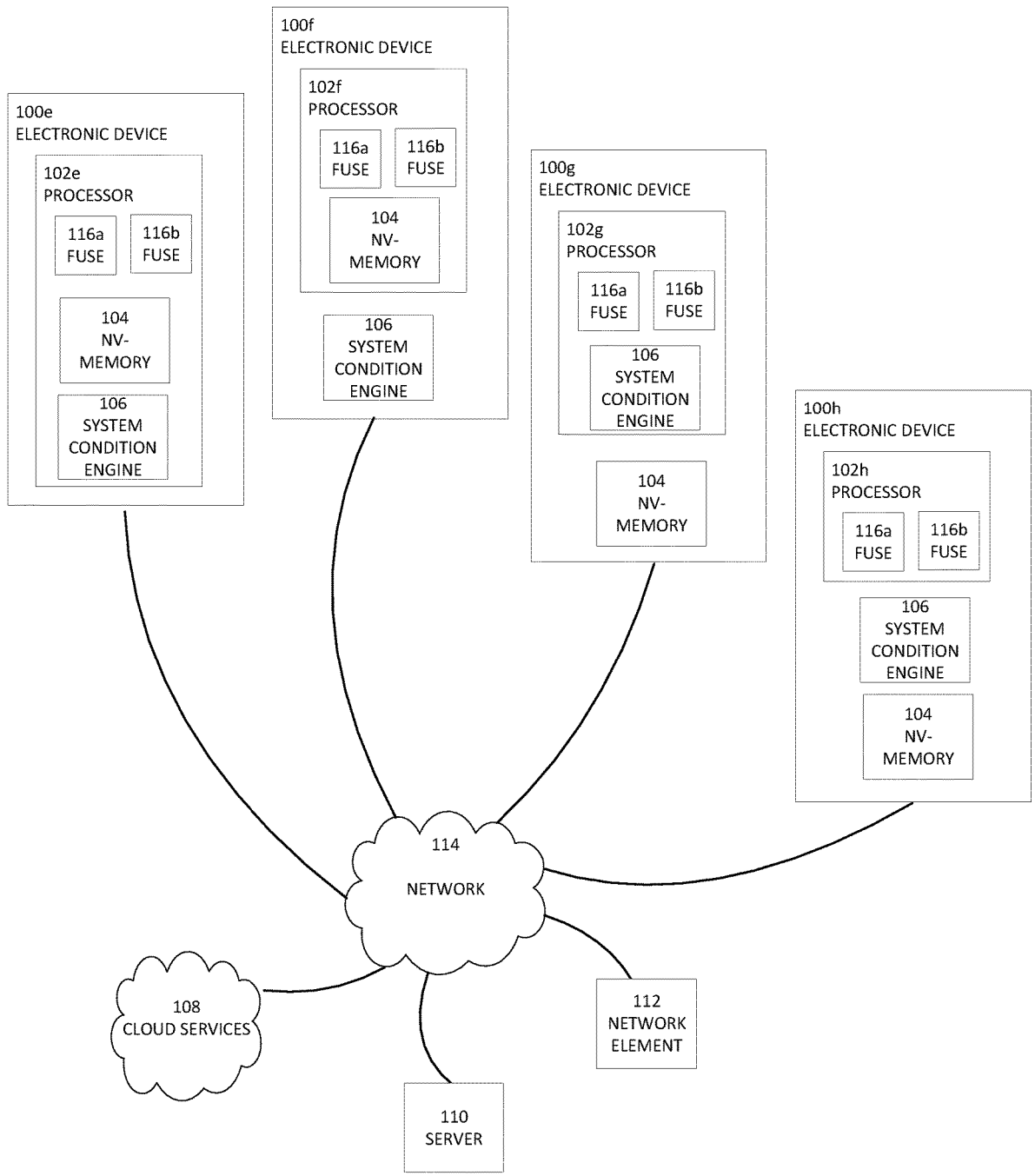
FIG. 1B is a simplified block diagram of electronic devices to enable out-of-specification detection, in accordance with an embodiment of the present disclosure.

Turning to FIG. 1B, FIG. 1B is a simplified block diagram of an electronic device configured with out-of-specification detection, in accordance with an embodiment of the present disclosure. In an example, an electronic device 100e can include a processor 102e. Processor 102e can include non-volatile memory 104, system condition engine 106, and one or more spec fuses 116a and 116b. An electronic device 100f can include a processor 102f and system condition engine 106. Processor 102b can include non-volatile memory 104 and one or more spec fuses 116a and 116b. An electronic device 100g can include a processor 102g and non-volatile memory 104. Processor 102c can include system condition engine 106 and one or more spec fuses 116a and 116b. An electronic device 100h can include a processor 102h, non-volatile memory 104, and system condition engine 106. Processor 102h can include one or more spec fuses 116a and 116b. Each of electronic devices 100e-100h may be in communication with cloud services 108, server 110, and/or one or more network elements 112 using network 114. In some examples, one or more of electronic devices 100e-100h may be a standalone device and not connected to network 114 or another device.

System condition engine 106 can be configured to monitor one or more conditions associated with an electronic device. For example, system condition engine 106 in electronic device 100e can be configured to monitor when a processor is overclocked, a temperature condition, a pressure condition, an impact force condition, a relative humidity condition, an altitude condition, or some other condition associated with electronic device 100e. Spec fuses 116a and 116b are fuses that store the predetermined specification range or the specification threshold for each of the one or more conditions associated with an electronic device that are monitored by system condition engine 106. For example, spec fuse 116a may store a frequency that would indicate if processor 102e has been overclocked and spec fuse 116b may store an operational temperature range for electronic device 100e. When one of the one or more conditions associated with an electronic device is outside of a predetermined specification range or exceeds a specification threshold, system condition engine 106 can record that the condition was outside of the predetermined specification range or exceeded the specification threshold. In an example, system condition engine 106 can record that the condition was outside of the predetermined specification range or exceeded the specification threshold in non-volatile memory 104.

Figure 1C:
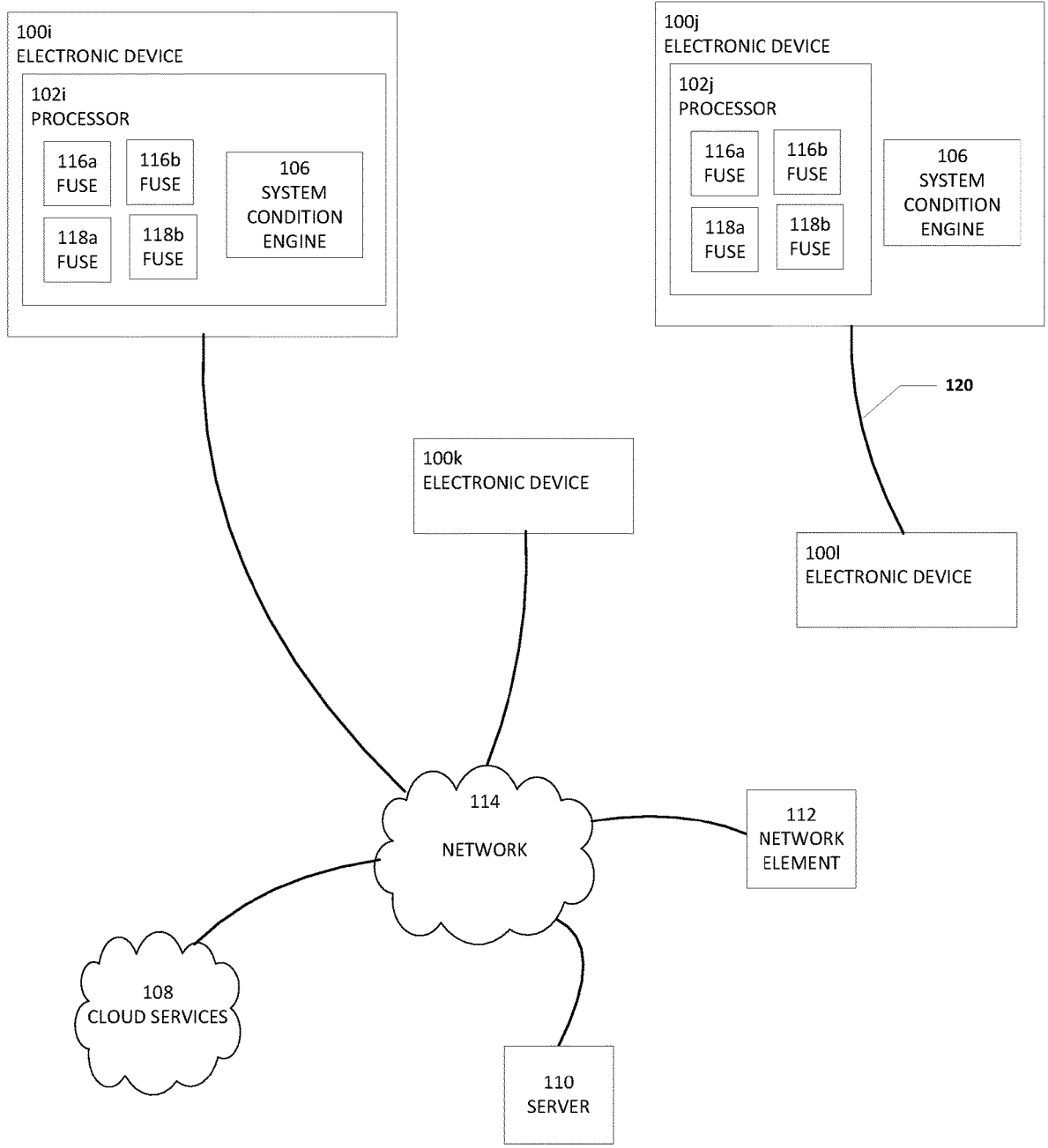
FIG. 1C is a simplified block diagram of electronic devices to enable out-of-specification detection, in accordance with an embodiment of the present disclosure.

Turning to FIG. 1C, FIG. 1C is a simplified block diagram of an electronic device configured with out-of-specification detection, in accordance with an embodiment of the present disclosure. In an example, an electronic device 100i can include a processor 102i. Processor 102i can include system condition engine 106, one or more spec fuses 116a and 116b, and one or more out-of-spec indicator fuses 118a and 118b. An electronic device 100j can include a processor 102j and system condition engine 106. Processor 102j can include one or more spec fuses 116a and 116b and one or more out-of-spec indicator fuses 118a and 118b. Each of electronic devices 100i and 100j may be in communication with cloud services 108, server 110, and/or one or more network elements 112 using network 114. In some examples, one or more of electronic devices 100i and 100j may be a standalone device and not connected to network 114 or another device.

System condition engine 106 can be configured to monitor one or more conditions associated with an electronic device. Spec fuses 116a and 116b are fuses that store the predetermined specification range or the specification threshold for each of the one or more conditions associated with an electronic device that are monitored by system condition engine 106. For example, spec fuse 116a may store a frequency that would indicate if processor 102i has been overclocked and spec fuse 116b may store an operational temperature range for electronic device 100i. When one of the one or more conditions associated with an electronic device is outside of a predetermined specification range or exceeds a specification threshold, system condition engine 106 can record that the condition was outside of the predetermined specification range or exceeded the specification threshold in out-of-spec indicator fuses 118a or 118b. In an example, system condition engine 106 can record that the condition was outside of the predetermined specification range or exceeded the specification threshold by triggering out-of-spec indicator fuse 118a or 118b.

System condition engine 106 can be part of a processor (e.g., firmware) or separate from the processor. If it is separate from the processor, system condition engine 106 can be used for off time issues like shipping and may have its own power supply (e.g., a battery). System condition engine 106 can be a system monitoring engine that is configured to monitor conditions of an electronic device. In a specific example, system condition engine 106 can be within a power control unit (PCU).

In a specific example, system condition engine 106 can be used to help determine if a processor has been overclocked. This capability can be used with telemetry in the field to observe if a processor has been overclocked for remote diagnostics and studies, for example, to study sensitivity to failure associated with overclocking or if a processor has been overclocked as part of a security attack. A unit which has been overclocked is more likely to fail than one that has not been overclocked. In addition, system condition engine 106 can monitor conditions related to a processor, chiplet, or some other component for prognostics or predicting future failure. In other examples, system condition engine 106 can monitor conditions related to structural components to help and determine prognostics, predict future mechanical failure (e.g., a condition related to temperature that may indicate when cracks may form in a pipe), or provide an advance indication or portent a future event related to a device, element, component, etc.

In an example, a condition can be monitored at a predetermined time interval (e.g., every second, two minutes, twenty minutes, one hour, twenty-four hours, etc.), upon the occurrence of an event (e.g., start up, state transitions, opening of a specific application, beginning of a specific process or function, etc.), etc. More specifically, when monitoring for overclocking of a processor, system condition engine 106 may determine if the processor has been overclocked every twelve (12) hours, twenty-four (24) hours, at startup, etc. because the condition of a processor being overclocked is not likely to frequently change. When monitoring for a condition that can frequency change, for example when a temperature is above or below a threshold, system condition engine 106 may determine the condition, for example, temperature reading more frequently (e.g., every second, two minutes, twenty minutes, one hour, etc.) as the condition is likely to frequently change.

Non-volatile memory 104 and/or spec fuses 116a or 116b can store a predetermined specification range or a specification threshold for each of the one or more conditions associated with an electronic device that are monitored by system condition engine 106. In an example, the predetermined specification range or the specification threshold for each of the one or more conditions associated with the electronic device that are monitored by system condition engine 106 may be stored in firmware. If a condition is determined to be outside of a predetermined specification range or exceed a specification threshold, the determination that the condition was outside of the predetermined specification range for the condition or exceeded the specification threshold associated with the condition can be stored in non-volatile memory 104 or out-of-spec indicator fuse 118a or 118b. In an example, an indicator (e.g., a flag or some other indicator to identify that a certain condition has met) is set if there is a condition outside of the range of the predetermined specification range or the specification threshold. The non-volatile memory may be non-volatile memory 104, out-of-spec indicator fuses 118a or 118b, firmware, or some other type of non-volatile memory that can record that the condition was outside of the predetermined specification range or exceeded the specification threshold.

Out-of-spec indicator fuses 118a and 118b can be on the same processor as spec fuses 116a or 116b, on another processor other than spec fuses 116a or 116b, or in some other location. Out-of-spec indicator fuses 118a or 118b can be a mechanism for recording that a condition was outside of the predetermined specification range or exceeded the specification threshold and may be at a "1" state or a "0" state. When out-of-spec indicator fuse 118a or 118b is triggered, the triggered fuse can change state. For example, if out-of-spec indicator fuse 118a is at a "1," when out-of-spec indicator fuse 118a is triggered, it reverts to a "0" state. In a specific example, out-of-spec indicator fuses 118a and 118b may be shorted material (e.g., metal) that becomes open when it is heated above a predetermined temperature. Spec fuses 116a and 116b and out of-spec fuses 118a and 118b may each be a one-time writeable non-volatile memory element that can be part of a circuit design that allows it to be written during field operation.

In an example, an electronic device 100k may be in communication with electronic device 100i through network 114. Using network 114, electronic device 100k can analyze or read out-of-spec indicator fuses 118a and 118b to see if they were triggered. In other examples, electronic device 100k may use network 114 to access electronic device 100i and analyze or read non-volatile memory 104 (shown in FIGS. 1A and 1B) to see if an indicator (e.g., flag) was set or some other indicator was made to indicate a condition was outside of a predetermined specification range or exceeded a specification threshold.

In another example, an electronic device 100l may be in direct communication with electronic device 100j using direct connection 120. Direct connection 120 may be a cable connection, USB connection, wireless connection, or some other type of direct connection that does not go through network 114. Using direct connection 120, electronic device 100l can analyze or read out-of-spec indicator fuses 118a and 118b to see if they were triggered. In other examples, electronic device 100l may use direct connection 120 to access electronic device 100j and check non-volatile memory 104 (shown in FIGS. 1A and 1B) to see if an indicator (e.g., flag) was set to indicate a condition was outside of a predetermined specification range or exceeded a specification threshold. Each of electronic devices 100k and 100l may be a diagnostic device.

Elements of FIGS. 1A-1C may be coupled to one another through one or more interfaces employing any suitable connections (wired or wireless), which provide viable pathways for network (e.g., network 114, etc.) communications. Additionally, any one or more of these elements of FIGS. 1A-1C may be combined or removed from the architecture based on particular configuration needs. Electronic devices 100a-100l may include a configuration capable of transmission control protocol/Internet protocol (TCP/IP) communications for the transmission or reception of packets in a network. Electronic devices 100a-100l may also operate in conjunction with a user datagram protocol/IP (UDP/IP) or any other suitable protocol where appropriate and based on particular needs.

Network 114 represents a series of points or nodes of interconnected communication paths for receiving and transmitting packets of information that propagate through the system. Network 114 offers a communicative interface between nodes, and may be configured as any local area network (LAN), virtual local area network (VLAN), wide area network (WAN), wireless local area network (WLAN), metropolitan area network (MAN), Intranet, Extranet, virtual private network (VPN), and any other appropriate architecture or system that facilitates communications in a network environment, or any suitable combination thereof, including wired and/or wireless communication.

In the system, network traffic, which is inclusive of packets, frames, signals, data, etc., can be sent and received according to any suitable communication messaging protocols. Suitable communication messaging protocols can include a multi-layered scheme such as Open Systems Interconnection (OSI) model, or any derivations or variants thereof (e.g., Transmission Control Protocol/Internet Protocol (TCP/IP), user datagram protocol/IP (UDP/IP)). Messages through the network could be made in accordance with various network protocols, (e.g., Ethernet, Infiniband, OmniPath, etc.). Additionally, radio signal communications over a cellular network may also be provided in the system. Suitable interfaces and infrastructure may be provided to enable communication with the cellular network.

The term "packet" as used herein, refers to a unit of data that can be routed between a source node and a destination node on a packet switched network. A packet includes a source network address and a destination network address. These network addresses can be Internet Protocol (IP) addresses in a TCP/IP messaging protocol. The term "data" as used herein, refers to any type of binary, numeric, voice, video, textual, or script data, or any type of source or object code, or any other suitable information in any appropriate format that may be communicated from one point to another in electronic devices and/or networks. The data may help determine a status of a network element or network. Additionally, messages, requests, responses, and queries are forms of network traffic, and therefore, may comprise packets, frames, signals, data, etc.

It is to be understood that other embodiments may be utilized and structural changes may be made without departing from the scope of the present disclosure. Substantial flexibility is provided by electronic devices 100a-100l in that any suitable arrangements and configuration may be provided without departing from the teachings of the present disclosure.

For purposes of illustrating certain example techniques of electronic devices 100a-100l, the following foundational information may be viewed as a basis from which the present disclosure may be properly explained. End users have more media and communications choices than ever before. A number of prominent technological trends are currently afoot and some of the technological trends can place increasing performance demands on the system. One way to deal with the increasing performance demands is to overclock processors. Overclocking a processor is the practice of increasing the clock frequency of the processor, often to exceed the specifications of the processor and the frequency of the processor that was certified by the manufacturer. During overclocking of the processor, the operating voltage is also increased to maintain the processor's operational stability at the overclocked frequencies. Increasing the processor's clock frequency causes the processor to perform more operations per second but it also produces additional heat. In a specific example, some processors are configured so that the user can set the core operational frequency above the specifications of the processor and the frequency that the processor was qualified to by the manufacturer. This is especially appealing to users whose applications are intense, such as games, media editing, or content creation, and to users who identify as enthusiasts and simply want to have the most powerful processors in their system.

To overclock the frequency of the processor, the operational voltage must also be set higher than the specifications of the processor. For modern processors, the probability of failure in a given time period is a very strong function of voltage and an increase in voltage causes an increase in the probability of failure. In addition, higher voltage and frequency tend to increase the processor's temperature, which also increases the probability of failure. As a result, overclocking may greatly reduce the time to failure and the possibility of a returned unit for a refund or credit.

To obtain the higher frequency used when a processor is overclocked, the processor needs a higher voltage for the transistors to switch more quickly because it takes more current to toggle from one state to another state. The higher voltage can cause temperature increases in the system. The temperature increases can cause a reduction in device performance, a reduction in the lifetime of a device, and delays in data throughput. If a user overclocks a processor and it fails, the user may return the processor and say that they did not overclock it because for most processors, if a user overclocks the processor, the warranty for the processor is voided. Although overclocking, and in general operating out of-specification, voids the warranty, users may not admit to operating a device out of the specification ranges or limits when seeking a warranty return. Due to the more accelerated wear out while overclocking, the processor is more likely to fail, leading to more requests for replacement. In addition, some companies offer warranties where the return of an item (e.g., processor) is accepted for credit even if the user overclocked the processor or the processor failed while operating out-of-specification (e.g., operating below 0° C. for personal computers). However, it is still very useful to manufactures to understand if returned units were overclocked or operated out-of-specification. What is needed is a system, method, apparatus, etc. to create a means to detect processor and/or system operation that is an out-of-specification operation. It would be beneficial if the system, method, apparatus, etc. included a means to detect if a processor has ever been overclocked.

Out-of-specification detection, as outlined in FIGS. 1A-1C, can be used to help resolve these issues (and others). For example, an electronic device (e.g., electronic device 100a) can be configured to detect a processor and/or system or condition that is an out-of-specification condition. More specifically, the electronic device can be configured to determine when one of the one or more conditions associated with the electronic device is outside of a predetermined specification range or exceeds a specification threshold. For example, an of out-of-specification condition can include overclocking a processor, out-of-specification temperature condition, out-of-specification pressure condition, out-of-specification impact force condition, out-of-specification relative humidity condition, out-of-specification altitude condition, out-of-specification vibration, the presence of corrosive gases, etc. This may be of particular significance to systems used for industrial and Internet-of-things (IoT) applications where environmental extremes or temperature and relative humidity may be more likely to occur. When an of out-of-specification condition is detected, the detection of the out-of-specification condition can be logged in non-volatile memory.

In an example, a system condition engine (e.g., system condition engine 106) can be configured to periodically check for conditions associated with the electronic device that are outside of a predetermined specification range or exceed a specification threshold. The periodic check may be about every one (1) to two (2) seconds or a longer period (e.g., two minutes, one hour, four hours, twenty-four hours, two days, etc.). If the system condition engine determines an out-of-specification condition, then information related to the event can be written to non-volatile memory.

In a specific example, the system condition engine can be configured to periodically determine if a processor is being overclocked. If overclocking is determined, then information related to the determination that the processor is being overclocked is written to non-volatile memory and in some examples, the degree of overclocking is written to the non-volatile memory. In a specific example, the system condition engine can be configured to periodically read a temperature sensor for devices on a container ship, a time sensor indicating if a device has been stored too long, a shock and/or vibration sensor, a tilt sensor, or monitor some other condition that does not require the device to be powered on.

A processor core (or simply "core") is an individual processor within a CPU. Many computers today have multi-core processors, where one or more processors include more than one core. One approach to determining overclocking is to assess the actual frequency for a certain number of processor cores verses the allowed frequency. If one core is in operation, a relatively high frequency (e.g., 5 GHz) may be allowed because the system is not power limited when only one core is running. However, if four cores are operating, then a lower frequency (e.g., 4.4 GHz) might be the highest frequency that is allowed for each core. To overclock a processor with multiple cores, some users may operate all the cores at the relatively high frequency (e.g., 5 GHz on all 4 cores). The system condition engine can be configured to determine the number of cores that are active as well as the frequency for each core. There are other conditions that may be of interest including if the requested voltage is higher than a specification threshold and if a maximum threshold temperature is exceedance.

The predetermined specification range or specification threshold can be stored in non-volatile memory. In some examples, the non-volatile memory may be one or more fuses. Some processors include an array of fuses which are used for many purposes, such as defining setpoints for individual units during test and manufacture. The fuses can be read, and more critically written or activated. For example, fuses are used for security keys and to indicate to the PCU allowed frequencies and associated voltages.

The system condition engine can be configured to periodically read the predetermined specification range or specification threshold from the non-volatile memory and compare the predetermined specification range or specification threshold to the readings or measurements of conditions of components associated with the predetermined specification range or specification threshold. If a reading or measurement of a condition of a component associated with the predetermined specification range or specification threshold is outside of the predetermined specification range or specification threshold, the determined condition of the component that was outside the predetermined specification range or specification threshold is written to the non-volatile memory. In an example, the non-volatile memory may be a "chiplet" on a multi-chip package that can be read even if the central processing unit is damaged or no longer functioning or operational. If a unit is returned, the non-volatile memory can be read to help determine if the device was operated within a predetermined specification range or specification threshold. In some examples, if a reading or measurement of a condition of a component associated with the predetermined specification range or specification threshold is determined to be outside of the predetermined specification range or specification threshold, the determined condition of the component that was outside the predetermined specification range or specification threshold is written to a fuse that can be read out through a test ports, even if the device is not functional and/or the processor is damaged or is no longer functional. By reading the determined condition of the component that was outside the predetermined specification range or specification threshold from non-volatile memory, manufacturers can be aware of the out-of-specification operation and can manage the return process accordingly.

In some examples, the degree of the determined condition of the component that was outside the predetermined specification range or specification threshold is written to non-volatile memory. For example, an indication of how high above a specification frequency the processor was operating can be written to the non-volatile memory. That is, the information does not have to simply be a single bit representing "overclocking yes or no" and more insight can be provided.

Additionally, for the system level sensing, the system may include a battery-powered module on a system board to detect the out-of-specification condition (e.g., temperature, relative humidity, shock, vibration, altitude, etc.) during shipping and storage even before the first user power-on. This will provide original equipment manufacturer (OEM) information which can be used in negotiation with shipping companies regarding not meeting non-operational shipping and storage specifications and product damage. The information stored may include a time stamp to help distinguish if the damage was during shipping or storage.

In an example implementation, electronic devices 100a-100l are meant to encompass a computer, a personal digital assistant (PDA), a laptop or electronic notebook, a cellular telephone, mobile device, personal digital assistants, smartphones, tablets, an IP phone, wearables, IoT device, network elements, network appliances, servers, routers, switches, gateways, bridges, load balancers, processors, modules, or any other similar device, component, element, or object that includes or has conditions that can be measured. Electronic devices 100a-100l may include any suitable hardware, software, components, modules, or objects that facilitate the operations thereof, as well as suitable interfaces for receiving, transmitting, and/or otherwise communicating data or information in a network environment. This may be inclusive of appropriate algorithms and communication protocols that allow for the effective exchange of data or information. Electronic device 100a may include virtual elements.

In regards to the internal structure associated with electronic devices 100a-100l, electronic devices 100a-100l can include memory elements for storing information to be used in operations or functions. Electronic devices 100a-100l may keep information in any suitable memory element (e.g., random access memory (RAM), read-only memory (ROM), erasable programmable ROM (EPROM), electrically erasable programmable ROM (EEPROM), application specific integrated circuit (ASIC), etc.), software, hardware, firmware, or in any other suitable component, device, element, or object where appropriate and based on particular needs. Any of the memory items discussed herein should be construed as being encompassed within the broad term 'memory element.' Moreover, the information being used, tracked, sent, or received in electronic devices 100a-100l could be provided in any database, register, queue, table, cache, control list, or other storage structure, all of which can be referenced at any suitable timeframe. Any such storage options may also be included within the broad term 'memory element' as used herein.

In certain example implementations, functions may be implemented by logic encoded in one or more tangible media (e.g., embedded logic provided in an ASIC, digital signal processor (DSP) instructions, software (potentially inclusive of object code and source code) to be executed by a processor, or other similar machine, etc.), which may be inclusive of non-transitory computer-readable media. In some of these instances, memory elements can store data used for the operations described herein. This includes the memory elements being able to store software, logic, code, or processor instructions that are executed to carry out the activities.

Additionally, electronic devices 100a-100l may include one or more processors that can execute software or an algorithm to perform activities. A processor can execute any type of instructions associated with the data to achieve one or more operations. In one example, the processors could transform an element or an article (e.g., data) from one state or thing to another state or thing. In another example, the activities outlined herein may be implemented with fixed logic or programmable logic (e.g., software/computer instructions executed by a processor) and electronic devices 100a-100l could include some type of a programmable processor, programmable digital logic (e.g., a field programmable gate array (FPGA), an erasable programmable read-only memory (EPROM), an electrically erasable programmable read-only memory (EEPROM)) or an ASIC that includes digital logic, software, code, electronic instructions, or any suitable combination thereof. Any of the potential processing elements and modules described herein should be construed as being encompassed within the broad term 'processor.'

Figure 2:
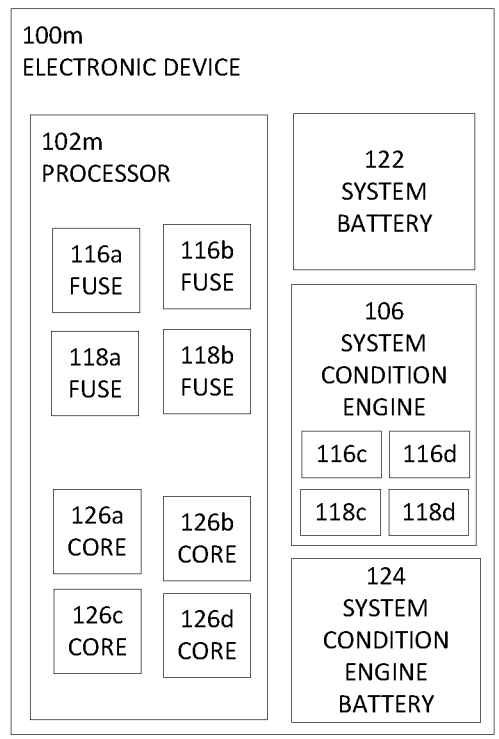
FIG. 2 is a simplified block diagram view of an electronic device to enable out-of-specification detection, in accordance with an embodiment of the present disclosure.

Turning to FIG. 2, FIG. 2 is a simplified block diagram of an electronic device configured with out-of-specification detection, in accordance with an embodiment of the present disclosure. In an example, electronic device 100m can include processor 102m, system condition engine 106, system battery 122, and system condition engine battery 124. Processor 102m can include one or more spec fuses 116a and 116b, one or more out-of-spec indicator fuses 118a and 118b, and a plurality of cores 126a-126d. System condition engine 106 can include one or more spec fuses 116c and 116d and one or more out-of-spec fuses 118c and 118d. System battery 122 can be the main battery supply for electronic device 100m. System condition engine battery 124 can provide power to system condition engine 106 when electronic device 100m is powered down or off.

System condition engine 106 can be configured to monitor one or more conditions associated with the electronic device that includes system condition engine 106. Spec fuses 116a and 116b are fuses that store the predetermined specification range or the specification threshold for each of the one or more conditions associated with the electronic device that are monitored by system condition engine 106. For example, spec fuse 116a may store a frequency that would indicate if processor 102e has been overclocked. Some processors have multiple cores and one approach to determining overclocking is to assess the actual frequency ratio for a certain number of processor cores verses the allowed frequency. For example, if core 126a is in operation, a relatively high frequency (e.g., 5 GHz) may be allowed because the system is not power limited when only core 126a is operating. However, if cores 126a-126d are in operation, then a lower frequency (e.g., 4.4 GHz) might be the highest frequency that is allowed. Some users may operate cores 126a-126d at the relatively high frequency (e.g., 5 GHz on all 4 cores). System condition engine 106 can be configured to determine the number of cores that are active as well as the frequency for each core. There are other conditions that may be monitored including if the requested voltage is higher than a specification threshold and if a maximum threshold temperature is exceedance.

In an example, using system condition engine battery 124, system condition engine 106 can be configured to monitor one or more conditions associated with electronic device 100m when electronic device 100m is powered down or off. Spec fuses 116c and 116d are fuses that store the predetermined specification range or the specification threshold for each of the one or more conditions associated with an electronic device that are monitored by system condition engine 106 when electronic device 100m is powered down or off. For example, when electronic device 100m is powered down or off, system condition engine 106 can be configured to monitor the temperature of electronic device 100m for an out-of-specification temperature condition, the pressure on electronic device 100m for an out-of-specification pressure condition, impact forces on electronic device 100m for an out-of-specification impact force condition, the relative humidity around electronic device 100m for an out-of-specification relative humidity condition, etc. When one of the one or more conditions associated with electronic device 100m is outside of a predetermined specification range or exceeds a specification threshold, system condition engine 106 can record that the condition was outside of the predetermined specification range or exceeded the specification threshold in out-of-spec fuses 118c or 118d.

Figure 3:
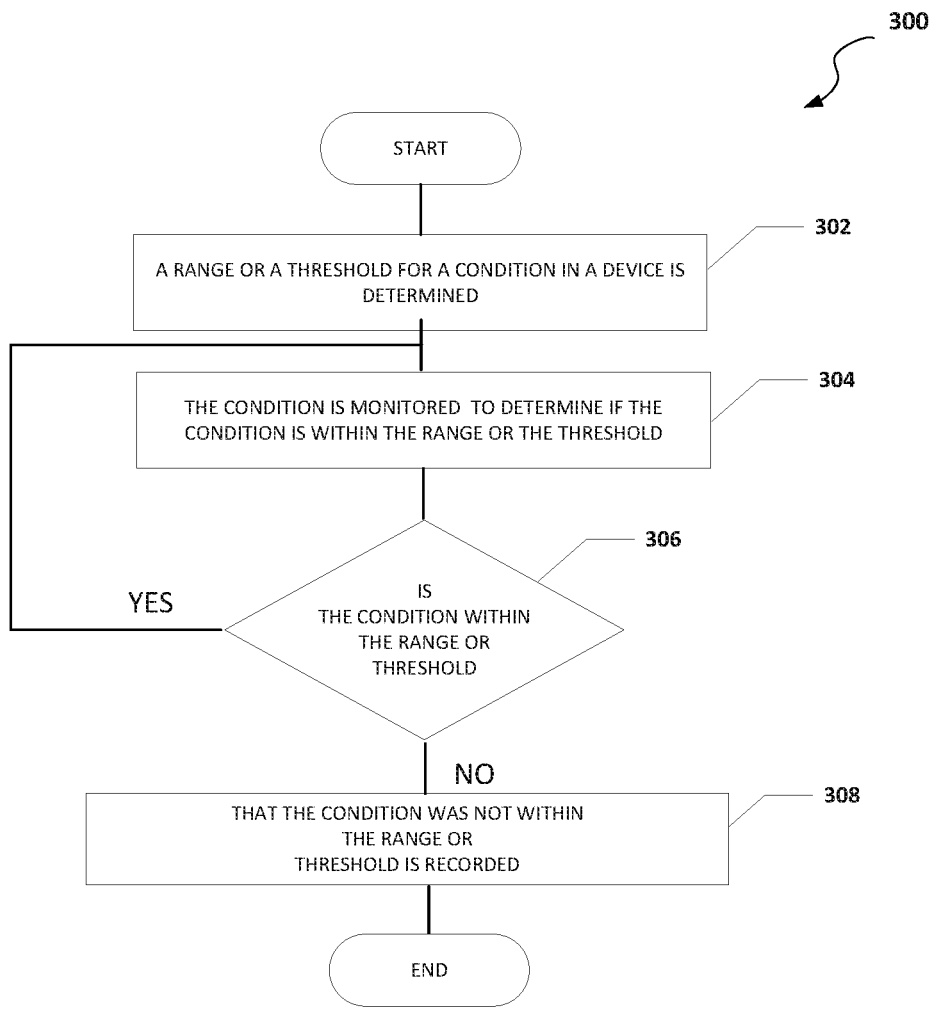
FIG. 3 is a simplified flowchart illustrating potential operations that may be associated with the system in accordance with an embodiment of the present disclosure.

Turning to FIG. 3, FIG. 3 is an example flowchart illustrating possible operations of a flow 300 that may be associated with out-of-specification detection, in accordance with an embodiment. In an embodiment, one or more operations of flow 300 may be performed by system condition engine 106. At 302, a range or a threshold for a condition in a device is determined. For example, the condition may be when a processor is overclocked, a temperature condition, a pressure condition, impact force condition, relative humidity condition, an altitude condition, the presence of corrosive gases, etc. The range or threshold can be obtained from non-volatile memory (e.g., non-volatile memory 104), a fuse (spec fuse 116a), firmware, or some other location. In some examples, the range or threshold is a specification range or a specification threshold. At 304, the condition is monitored to determine if the condition is within the range or the threshold. In an example, the condition can be monitored at a predetermined time interval (e.g., every second, two minutes, twenty minutes, one hour, twenty-four hours, etc.), upon the occurrence of an event (e.g., start up, state transitions, opening of a specific application, beginning of a specific process or function, etc.), etc. At 306, the system determines if the condition is within the range or the threshold. If the condition is within the range or the threshold, then the condition continues to be monitored to determine if the condition is within the range or the threshold, as in 304. If the condition is not within the range or the threshold, then the condition that was not within the range or threshold is recorded. For example, the condition may be recorded in non-volatile memory (e.g., not-volatile memory 104), a fuse (out-of-spec indicator fuse 118a), firmware, or some other location.

Figure 4:
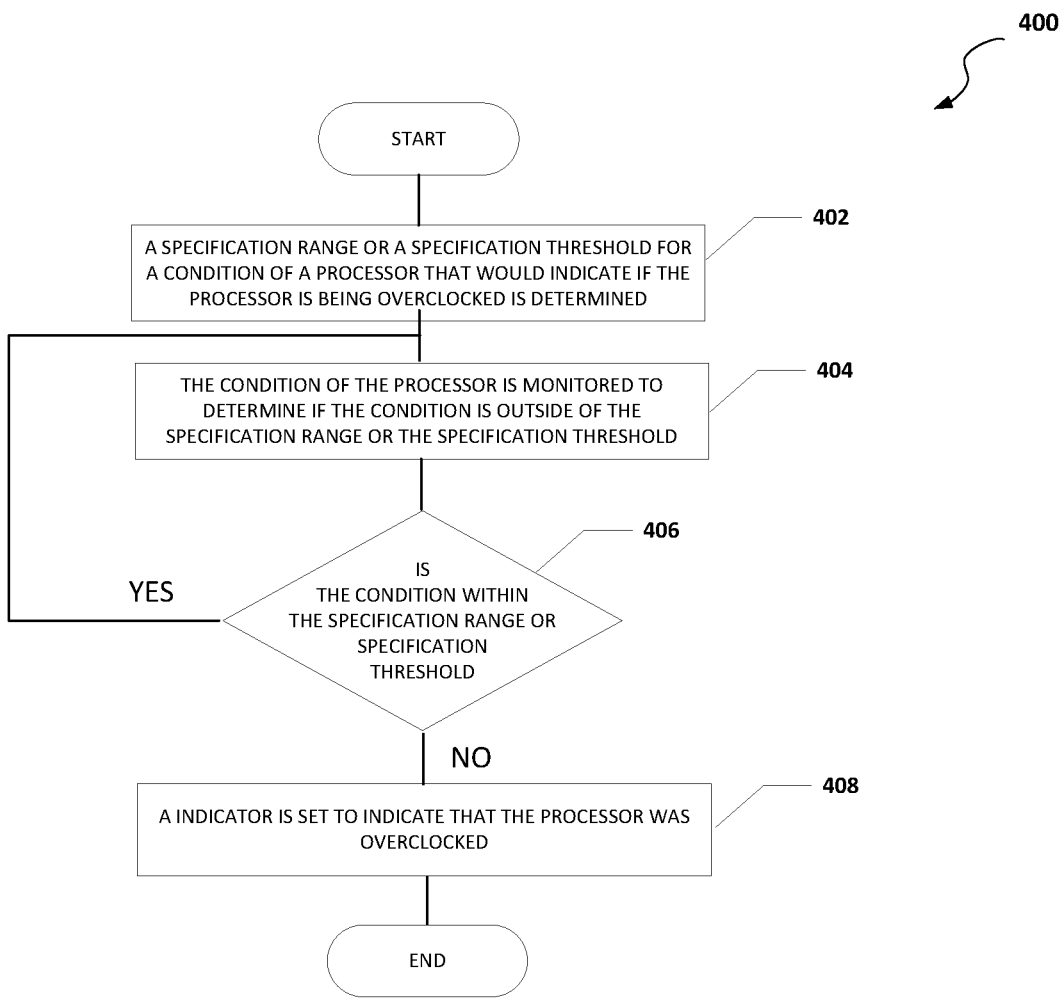
FIG. 4 is a simplified flowchart illustrating potential operations that may be associated with the system in accordance with an embodiment of the present disclosure.

Turning to FIG. 4, FIG. 4 is an example flowchart illustrating possible operations of a flow 400 that may be associated with out-of-specification detection, in accordance with an embodiment. In an embodiment, one or more operations of flow 400 may be performed by system condition engine 106. At 402, a specification range or a specification threshold for a condition of a processor that would indicate if the processor is being overclocked is determined. For example, a frequency of the processor, a voltage condition, temperature condition, or some other condition that can indicate if the processor is being overclocked is determined. The specification range or specification threshold for the condition of the processor that would indicate if the processor is being overclocked can be obtained from non-volatile memory (e.g., not-volatile memory 104), a fuse (spec fuse 116a), firmware, or some other location. At 404, the condition of the processor is monitored to determine if the condition is within the specification range or the specification threshold. In an example, the condition can be monitored at a predetermined time interval (e.g., every second, two minutes, twenty minutes, one hour, twenty-four hours, etc.), upon the occurrence of an event (e.g., start up, state transitions, opening of a specific application, beginning of a specific process or function, etc.), etc. At 406, the system determines if the condition is within the specification range or the specification threshold. If the condition is within the specification range or the specification threshold, then the condition of the processor continues to be monitored to determine if the condition is within the specification range or the specification threshold, as in 404. If the condition is not within the specification range or the specification threshold, then an indicator is set to indicate that the processor was overclocked. For example, the indicator may be set in non-volatile memory (e.g., not-volatile memory 104), fuse (out-of-spec indicator fuse 118a), firmware, or some other location.

Figure 5:
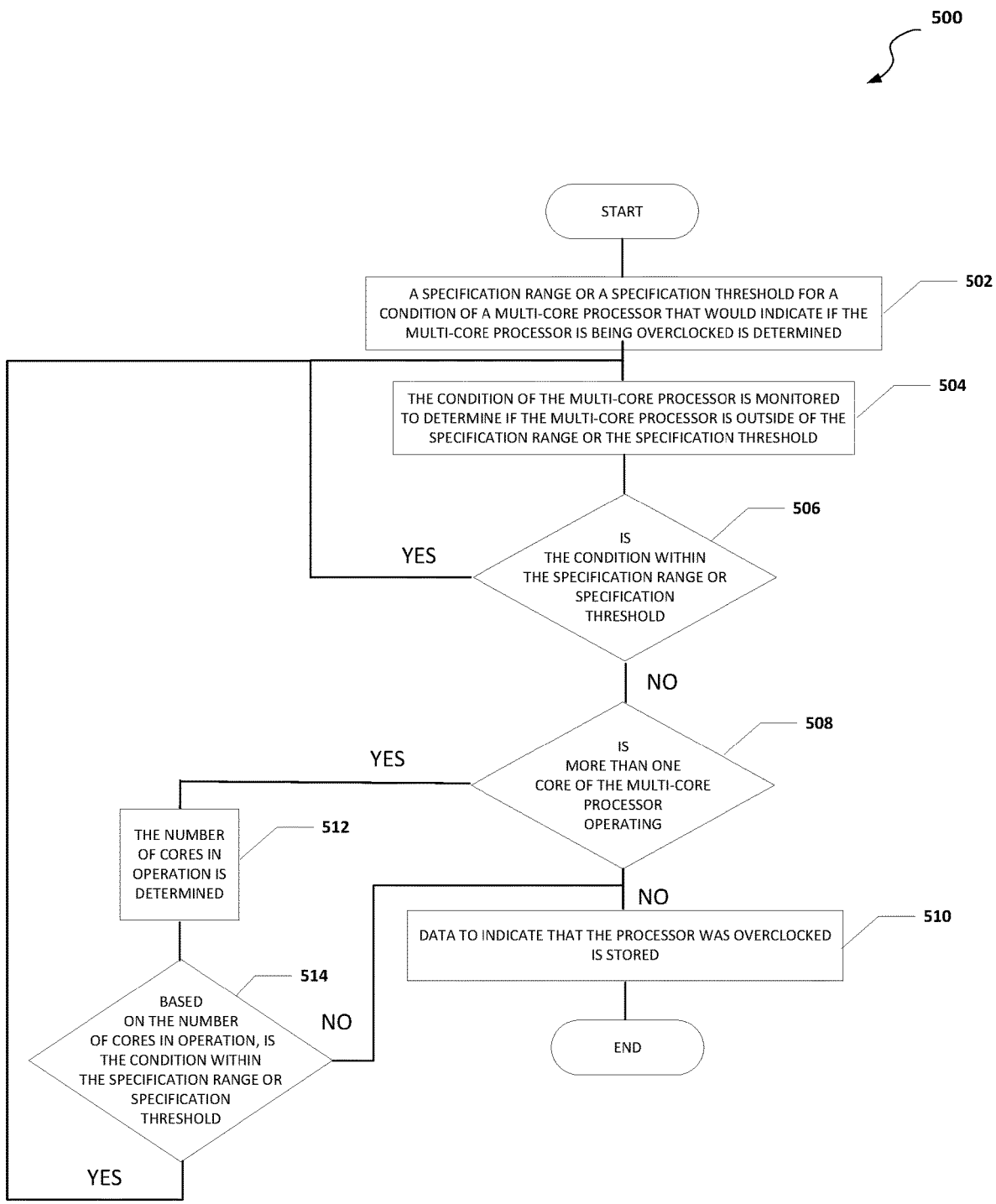
FIG. 5 is a simplified flowchart illustrating potential operations that may be associated with the system in accordance with an embodiment of the present disclosure.

Turning to FIG. 5, FIG. 5 is an example flowchart illustrating possible operations of a flow 500 that may be associated with out-of-specification detection, in accordance with an embodiment. In an embodiment, one or more operations of flow 500 may be performed by system condition engine 106. At 502, a specification range or a specification threshold for a condition of a multi-core processor that would indicate if the multi-core processor is being overclocked is determined. For example, a frequency of each core of the multi-core processor, a voltage condition, temperature condition, or some other condition that can indicate if the multi-core processor is being overclocked is determined. The specification range or specification threshold for the condition of the multi-core processor that would indicate if the multi-core processor is being overclocked can be obtained from non-volatile memory (e.g., non-volatile memory 104), a fuse (spec fuse 116*a*), firmware, or some other location. At 504, the condition of the multi-core processor is monitored to determine if the condition is within the specification range or the specification threshold. In an example, the condition can be monitored at a predetermined time interval (e.g., every second, two minutes, twenty minutes, one hour, twenty-four hours, etc.), upon the occurrence of an event (e.g., start up, state transitions, opening of a specific application, beginning of a specific process or function, etc.), etc. At 506, the system determines if the condition is within the specification range or the specification threshold. If the condition is within the specification range or the specification threshold, then the condition of the multi-core processor continues to be monitored to determine if the condition is within the specification range or the specification threshold, as in 504. If the condition is not within the specification range or the specification threshold, then the system determines if more than one core of the multi-core processor is operating, as in 508. If more than one core of the multi-core processor is not operating, then data to indicate that the processor was overclocked is stored, as in 510. For example, a flag may be set or some other indicator may be stored in non-volatile memory (e.g., not-volatile memory 104), a fuse (out-of-spec indicator fuse 118*a*), firmware, or some other location to indicate that the processor was overclocked. If more than one core of the multi-core processor is operating, then the number of cores in operation is determined, as in 512. At 514, the system determines, based on the number of cores in operation, if the condition is within the specification range or specification threshold. If, based on the number of cores in operation, the condition is not within the specification range or specification threshold, then data to indicate that the processor was overclocked is stored, as in 510. If, based on the number of cores in operation, the condition is within the specification range or specification threshold, then the condition of the multi-core processor continues to be monitored to determine if the condition is within the specification range or the specification threshold, as in 504. For example, if one core is in operation, a relatively high frequency (e.g., 4 GHz) may be allowed because the system is not power limited when only one core is running. However, if four cores are operating, then a lower frequency (e.g., 3.5 GHz) might be the highest frequency that is allowed for each core. To overclock a processor with multiple cores, some users may operate all the cores at the relatively high frequency (e.g., 4 GHz on all 4 cores). The system can be configured to determine the number of cores that are active and based on the number of active cores, if a condition is within a specification range or specification threshold.

It is also important to note that the operations in the preceding flow diagrams (i.e., FIGS. 3-5) illustrates only some of the possible scenarios and patterns that may be executed by, or within, electronic devices 100*a*-100*m*. Some of these operations may be deleted or removed where appropriate, or these operations may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by electronic devices 100*a*-100*m* in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. Moreover, certain components may be combined, separated, eliminated, or added based on particular needs and implementations. Additionally, although electronic devices 100*a*-100*f* have been illustrated with reference to particular elements and operations that facilitate the communication process, these elements and operations may be replaced by any suitable architecture, protocols, and/or processes that achieve the intended functionality of electronic devices 100*a*-100*f*.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

Other Notes and Examples

Example A1, is an electronic device including a system condition engine configured to monitor a condition associated with an electronic device and non-volatile memory. The non-volatile memory can store a predetermined specification range or a specification threshold for the condition and when the condition is outside of the predetermined specification range or exceeds the specification threshold, the system condition engine can record that the condition was outside of the predetermined specification range or exceeded the specification threshold in the non-volatile memory.

In Example A2, the subject matter of Example A1 can optionally include where the non-volatile memory is a plurality of fuses.

In Example A3, the subject matter of any one of Examples A1-A2 can optionally include where the predetermined specification range or the specification threshold is stored in a fuse.

In Example A4, the subject matter of any one of Examples A1-A3 can optionally include where the system condition engine can record that the condition was outside of the predetermined specification range or exceeded the specification threshold in one or more fuses.

In Example A5, the subject matter of any one of Examples A1-A4 can optionally include where the condition includes overclocking of a processor.

In Example A6, the subject matter of any one of Examples A1-A5 can optionally include where the electronic device further includes a processor, where the system condition engine and the non-volatile memory are located on the processor.

In Example A7, the subject matter of any one of Examples A1-A6 can optionally include where the system condition engine is powered by a battery that is separate from a battery that powers the electronic device.

Example M1 is a method including determining a range or threshold for one or more conditions associated with an electronic device, monitoring the one or more conditions associated with the electronic device, and recording that a specific condition from the monitored one or more conditions was outside of a specific range or exceeded a specific threshold associated with the specific condition in non-volatile memory when the specific condition is outside of the determined specific range or exceeded the specific threshold.

In Example M2, the subject matter of Example M1 can optionally include where the non-volatile memory is one or more fuses.

In Example M3, the subject matter of any one of the Examples M1-M2 can optionally include where the specific range or the specific threshold is stored in a fuse.

In Example M4, the subject matter of any one of the Examples M1-M3 can optionally include where a system condition engine records that the specific condition from the monitored one or more conditions was outside of the specific range or exceeded the specific threshold associated with the specific condition in one or more fuses.

In Example M5, the subject matter of any one of the Examples M1-M4 can optionally include where the one or more conditions associated with the electronic device includes overclocking of a processor.

In Example M6, the subject matter of any one of the Examples M1-M5 can optionally include where the non-volatile memory is located on a processor.

Example S1 is a system for enabling for enabling out-of-specification detection of a condition. The system can include one or more processors, a system condition engine configured to cause the one or more processors to monitor one or more conditions associated with an electronic device, and non-volatile memory. The non-volatile memory can store a predetermined specification range or a specification threshold for each of the one or more conditions associated with the electronic device being monitored, where when a specific condition from the one or more conditions associated with the electronic device is outside of a predetermined specification range associated with the specific condition or exceeds a specification threshold associated with the specific condition, system condition engine can cause the one or more processors to record that the specific condition was outside of the predetermined specification range associated with the specific condition or exceeded the specification threshold associated with the specific condition in the non-volatile memory.

In Example S2, the subject matter of Example S1 can optionally include where the non-volatile memory is one or more fuses.

In Example S3, the subject matter of any one of the Examples S1-52 can optionally include where the predetermined specification range associated with the specific condition or the specification threshold associated with the specific condition is stored in a fuse.

In Example S4, the subject matter of any one of the Examples S1-53 can optionally include where the one or more conditions associated with the electronic device monitored by the system condition engine includes overclocking of a specific processor.

In Example S5, the subject matter of any one of the Examples S1-54 can optionally include where the specific processor is a multi-core processor.

In Example S6, the subject matter of any one of the Examples S1-55 can optionally include where the system condition engine and non-volatile memory are located on the specific processor.

In Example S7, the subject matter of any one of the Examples S1-56 can optionally include where the system condition engine is powered by a battery that is separate from a battery that powers the system.

Example SS1 is a system for enabling for enabling out-of-specification detection of a condition. The system can include means for determining a range or threshold for one or more conditions associated with an electronic device, monitoring the one or more conditions associated with the electronic device, and recording that a specific condition from the monitored one or more conditions was outside of a specific range or exceeded a specific threshold associated with the specific condition in non-volatile memory when the specific condition is outside of the determined specific range or exceeded the specific threshold.

In Example SS2, the subject matter of Example SS1 can optionally include where the non-volatile memory is one or more fuses.

In Example SS3, the subject matter of any one of the Examples SS1-SS2 can optionally include where the specific range or the specific threshold is stored in a fuse.

In Example SS4, the subject matter of any one of the Examples SS1-SS3 can optionally include where a system condition engine records that the specific condition from the monitored one or more conditions was outside of the specific range or exceeded the specific threshold associated with the specific condition in one or more fuses.

In Example SS5, the subject matter of any one of the Examples SS1-SS4 can optionally include where the one or more conditions associated with the electronic device includes overclocking of a processor.

In Example SS6, the subject matter of any one of the Examples SS1-SS5 can optionally include where the non-volatile memory is located on a processor.

What is claimed is:

1. An electronic device comprising:
   a system condition engine powered by a secondary power source that is separate from a primary power source that powers the electronic device, the system condition engine configured to monitor a plurality of conditions associated with an electronic device, wherein one the plurality of conditions includes a processor frequency range and a second condition from the plurality of conditions includes a condition that is monitored when the electronic device is powered off; and
   non-volatile memory, wherein the non-volatile memory can store a predetermined range or a specification threshold for each of the plurality of conditions, wherein when a specific condition is outside of the predetermined range or exceeds the specification threshold, the system condition engine records that the specific condition is or was outside of the predetermined range or exceeded the specification threshold in a one-time writable non-volatile memory element.

2. The electronic device of claim 1, wherein the non-volatile memory is a plurality of fuses.

3. The electronic device of claim 1, wherein the predetermined range for the specific condition or the specification threshold for the specific condition is stored in a fuse.

4. The electronic device of claim 1, wherein the system condition engine can record that the specific condition was outside of the predetermined range for the specific condition or exceeded the specification threshold for the specific condition in one or more one-time writable fuses.

5. The electronic device of claim 1, wherein the specific condition includes an indication of overclocking of a processor.

6. The electronic device of claim 1, further comprising:
a processor, wherein the system condition engine and the non-volatile memory are located on the processor.

7. The electronic device of claim 1, wherein the system condition engine is powered by a battery that is separate from a battery that powers the electronic device.

8. A method comprising:
determining a range or threshold for a plurality of conditions associated with an electronic device;
monitoring, using a system condition engine powered by a secondary power source that is separate from a primary power source that powers the electronic device, at least a portion of the plurality of conditions associated with the electronic device wherein one of conditions includes a processor frequency range and a second condition includes a condition that is monitored when the electronic device is powered off; and
recording, in a one-time writable non-volatile memory element, that a specific condition from the monitored portion of the plurality of conditions is or was outside of a specific range or exceeded a specific threshold associated with the specific condition when the specific condition is outside of the specific range or exceeded the specific threshold.

9. The method of claim 8, wherein the one-time writable non-volatile memory element is one or more fuses.

10. The method of claim 8, wherein the specific range or the specific threshold is stored in a fuse.

11. The method of claim 8, wherein a system condition engine records that the specific condition from the monitored one or more conditions was outside of the specific range or exceeded the specific threshold associated with the specific condition in one or more fuses.

12. The method of claim 8, wherein the plurality of conditions associated with the electronic device includes one or more conditions that provide evidence of overclocking of a processor.

13. The method of claim 8, wherein the one-time writable non-volatile memory element is located on a processor.

14. A system for enabling out-of-specification detection of a condition of an electronic device, the system comprising:
one or more processors;
a system condition engine powered by a secondary power source that is separate from a primary power source that powers the electronic device, the system condition engine configured to cause the one or more processors to monitor conditions associated with the electronic device, wherein a first condition includes a frequency range of a specific processor and a second condition is a condition that is monitored when the electronic device is powered off; and
non-volatile memory, wherein the non-volatile memory can store a predetermined specification range or a specification threshold for each of the conditions associated with the electronic device being monitored, wherein when a specific condition is outside of a predetermined specification range associated with the specific condition or exceeds a specification threshold associated with the specific condition, system condition engine can cause the one or more processors to record that the specific condition is or was outside of the predetermined specification range associated with the specific condition or exceeded the specification threshold associated with the specific condition in a one-time writable non-volatile memory element.

15. The system of claim 14, wherein the one-time writable non-volatile memory element is one or more fuses.

16. The system of claim 14, wherein the predetermined specification range associated with the specific condition or the specification threshold associated with the specific condition is stored in a fuse.

17. The system of claim 14, wherein a first portion of the conditions associated with the electronic device monitored by the system condition engine includes conditions that provide evidence of overclocking of a specific processor and a second portion of the conditions associated with the electronic device monitored by the system condition engine includes environmental conditions related to transport and storage conditions of the electronic device.

18. The system of claim 17, wherein the specific processor is a multi-core processor.

19. The system of claim 17, wherein the system condition engine and the one-time writable non-volatile memory element are located on the specific processor.

20. The system of claim 14, wherein the system condition engine is powered by a battery that is separate from a battery that powers the system.

* * * * *